United States Patent
Cojocaru et al.

(10) Patent No.: US 9,151,400 B2
(45) Date of Patent: Oct. 6, 2015

(54) TORSIONAL SPRING FOR A SLAM-SHUT SAFETY DEVICE

(75) Inventors: Theodor Cojocaru, Iasi (RO); Adrian Valean, Cluj-Napoca (RO); Roman Alexandru-Vlad, Cluj-Napoca (RO)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 428 days.

(21) Appl. No.: 13/446,705

(22) Filed: Apr. 13, 2012

(65) Prior Publication Data

US 2012/0261005 A1  Oct. 18, 2012

Related U.S. Application Data

(60) Provisional application No. 61/476,169, filed on Apr. 15, 2011.

(51) Int. Cl.
  *F16K 17/00* (2006.01)
  *F16K 17/32* (2006.01)

(52) U.S. Cl.
  CPC ........... *F16K 17/32* (2013.01); *Y10T 137/7728* (2015.04)

(58) Field of Classification Search
  CPC ....... F16K 17/32; F16K 17/30; F16K 31/524; F16K 31/52408; Y10T 137/7723; Y10T 137/7728; Y10T 137/773; Y10T 137/8225
  USPC .......... 137/553, 463, 461, 456; 251/263, 262; 74/2
  See application file for complete search history.

(56) References Cited

U.S. PATENT DOCUMENTS

| | | | | |
|---|---|---|---|---|
| 2,587,358 A | | 2/1952 | McRae | |
| 3,386,465 A | * | 6/1968 | Johnson | 137/463 |
| 3,422,841 A | * | 1/1969 | Farrer | 137/461 |
| 4,134,421 A | * | 1/1979 | Cameron | 137/316 |
| 4,503,883 A | * | 3/1985 | Meacham, Jr. | 137/458 |
| 5,762,044 A | * | 6/1998 | Hollister et al. | 123/400 |
| 5,996,551 A | * | 12/1999 | Schroder | 123/337 |

(Continued)

FOREIGN PATENT DOCUMENTS

| | | |
|---|---|---|
| FR | 1129739 A | 1/1957 |
| GB | 1472888 A | 5/1977 |
| GB | 2203523 B | 6/1989 |

OTHER PUBLICATIONS

International Search Report dated Jul. 31, 2012, (PCT/US2012/033530).

(Continued)

*Primary Examiner* — Jessica Cahill
(74) *Attorney, Agent, or Firm* — Marshall, Gerstein & Borun LLP

(57) ABSTRACT

A cam assembly for use in a slam-shut safety valve includes a cam having an elongated first cam arm, and the cam is pivotable about a rotational axis. The cam assembly also includes a torsional spring having a pair of stationary outer arms and a pair of pivotable inner arms, wherein the pair of stationary inner arms is coupled to a portion of the first cam arm. The pair of inner arms is adapted to act on the first cam arm to bias the cam into a position that allows the cam to be relatched in a valve rearming process. The pair of inner arms is symmetrically disposed about the first cam arm to prevent lateral displacement of the cam.

9 Claims, 6 Drawing Sheets

(56) References Cited

U.S. PATENT DOCUMENTS

| | | | |
|---|---|---|---|
| 6,263,898 B1* | 7/2001 | Vanderveen et al. | 137/15.25 |
| 6,296,061 B1* | 10/2001 | Leismer | 166/386 |
| 6,918,374 B1* | 7/2005 | Kurita et al. | 123/396 |
| 2003/0217715 A1* | 11/2003 | Pierik | 123/90.16 |
| 2004/0261737 A1* | 12/2004 | Rohe et al. | 123/90.16 |
| 2008/0258096 A1* | 10/2008 | Hawkins | 251/321 |

OTHER PUBLICATIONS

Written Opinion of the International Searching Authority dated Jul. 31, 2012, (PCT/US2012/033530).

* cited by examiner

TORSIONAL SPRING FOR A SLAM-SHUT SAFETY DEVICE

FIELD OF THE DISCLOSURE

The disclosure generally relates to slam-shut type safety valves for gas distribution systems, and specifically relates to springs used in such safety valves.

BACKGROUND

Gas distribution systems, in particular natural gas distribution systems, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used for this purpose. The slam-shut safety valve is generally disposed upstream of the pressure regulating valve so that the slam-shut valve may prevent gas from reaching the pressure regulating valve in the event of a pressure regulating valve failure. The slam-shut safety valve monitors gas pressure downstream of the pressure regulating valve for maximum and minimum pressure tolerances. If the downstream pressure exceeds either the maximum or minimum tolerance, the slam-shut safety valve closes, cutting off the flow of gas to the pressure regulating valve and preventing an uncontrolled leak of gas due to the pressure regulating valve failure.

Typically, the slam-shut safety valve includes a cam having a first cam arm that is operatively coupled to a diaphragm that senses downstream pressure, thereby causing the cam to rotate about a rotational axis in response to changes in downstream pressure. The first cam arm is generally elongated, and a flexion spring is typically coupled to a distal end of the first cam arm. The flexion spring is typically formed from a single wire, and the flexion spring typically includes a wound cylindrical portion that is disposed around the distal end of the cam arm such that the longitudinal axis of the cylindrical portion is coaxial with a longitudinal axis of the elongated first cam arm. The flexion spring also includes an extended portion that outwardly extends from an end portion of the cylindrical portion in a linear direction that is parallel to the longitudinal axis of the elongated first cam arm. The extended portion typically contacts a surface disposed in the interior of the valve body. So configured, the flexion spring provides a biasing force that maintains the cam in a desired position to facilitate the rearming of the slam-shut safety valve after the slam-shut safety valve closes.

SUMMARY OF THE DISCLOSURE

In a first embodiment, a cam assembly for use in a slam-shut safety valve includes a cam having an elongated first cam arm, and the cam is pivotable about a rotational axis. The cam assembly also includes a torsional spring having a pair of stationary outer arms and a pair of pivotable inner arms, wherein the pair of stationary inner arms is coupled to a portion of the first cam arm. The pair of inner arms is adapted to act on the first cam arm to bias the cam into a position that allows the cam to be relatched in a valve rearming process.

In another embodiment, a slam-shut safety valve for a gas distribution system includes a valve body and a diaphragm disposed at least partially within an interior portion of the valve body. At least part of the diaphragm is displaceable into an interior portion of the valve body, and the diaphragm has a first side that is exposed to gas system pressure. The a slam-shut safety valve also includes a plunger connected to the first side of the diaphragm and a cam rotatably mounted within the interior of the valve body, the cam having a first cam arm and a third cam arm, wherein the first arm is coupled to the plunger. A torsional spring is operatively coupled to the first cam arm and at least one surface disposed in the interior portion of the valve body. The slam-shut safety valve also includes a reset pin assembly, the reset pin assembly including an elongated reset rod and a relatch plug fixedly coupled to the reset rod, wherein the torsional spring is adapted to act on the first cam arm to bias the cam into a desired position that allows the third cam arm to engage a shoulder portion of the relatch plug when the reset rod is displaced towards the cam in a valve rearming process, thereby relatching the cam.

DETAILED DESCRIPTION

Figure 1:
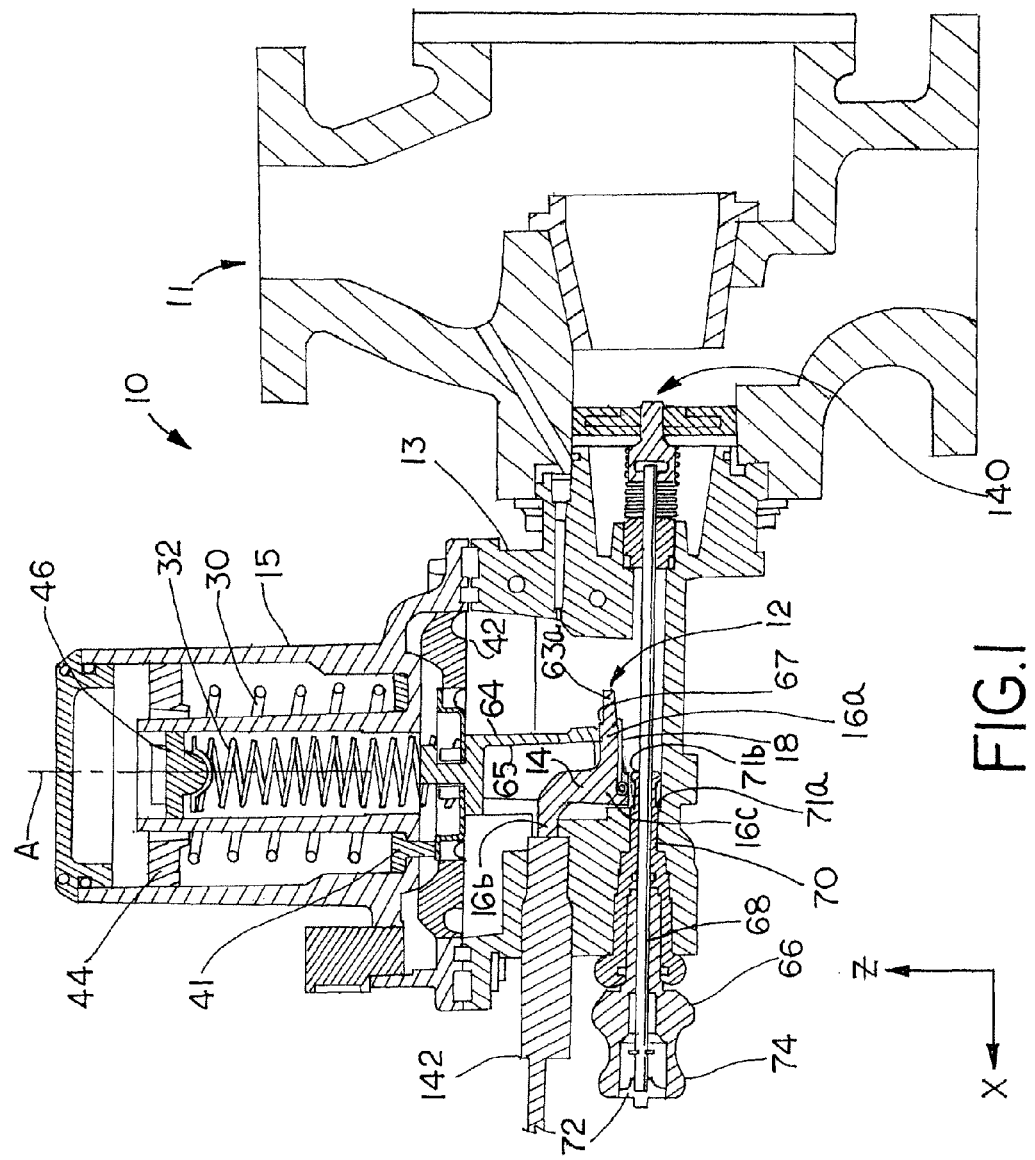
FIG. 1 is a side sectional view of an embodiment of a slam-shut safety device.

FIG. 1 illustrates a slam-shut safety device 10 constructed in accordance with the teachings of the disclosure. In particular, and as more clearly illustrated in FIG. 3, a cam assembly 12 for use in the slam-shut safety valve 10 includes a cam 14 having an elongated first cam arm 16a, and the cam 14 is pivotable about a rotational axis 19. The cam assembly 12 also includes a torsional spring 18, illustrated in FIGS. 3, 5A, and 5B, having a pair of stationary outer arms, such as a first outer arm 20a and a second outer arm 20b, and a pair of pivotable inner arms, such as a first inner arm 22a and a second inner arm 22b. The pair of inner arms 22a, 22b is coupled to a portion of the first cam arm 16a. The pair of inner arms 22a, 22b is adapted to act on the first cam arm 16a to bias the cam 14 into a position that allows the cam 14 to be relatched in a valve rearming process.

As illustrated in FIG. 1, the slam-shut safety valve 10 may be attached to a main regulator 11 in a gas distribution system. However, the slam-shut safety valve 10 may be a stand-alone module. The slam-shut safety device 10 may include a valve body 13, an upper case 15 attached to the valve body 13, and a reset pin assembly 66 partially protruding from the valve body 13. The upper case 15 houses an overpressure spring 30 and an underpressure spring 32. The underpressure spring 32 determines the lower (minimum) acceptable gas pressure in the gas distribution system. Similarly, the overpressure spring 30 determines the upper (maximum) acceptable gas pressure in the gas distribution system. Both the overpressure and underpressure springs 30, 32 are disposed within the upper case 15 in a generally co-axial configuration (i.e., the central axes of the two springs are co-located). However, the springs need not be axially co-located and the springs may be axially offset from one another. The underpressure spring 32 is coupled at one end to a diaphragm plate 37, and the overpressure spring is coupled at one end to an overpressure ring 41. The overpressure ring 41 may be coupled to the diaphragm plate 37. Both the diaphragm plate 37 and the overpressure ring 41 may be attached to the diaphragm 42. The diaphragm 42 is exposed on one side to system pressure, and on another side the diaphragm 42 is exposed to spring forces from the overpressure spring 30 and the under pressure spring 32. A portion of the diaphragm 42 is movable and displaceable into an interior portion of the valve body 13 or the upper case 15, depending on system pressure along axis A. Axis A is substantially parallel to or with coaxial with the central axes of the overpressure spring 30 and the underpressure spring 32, and axis A may be parallel to or collinear with the Z axis of the reference coordinate system provided in FIGS. 1 and 3. At ends opposite the diaphragm 42, the overpressure spring 30 and the underpressure spring 32 contact or are seated against an overpressure adjustment cap 44 and an underpressure adjustment cap 46, respectively. The overpressure adjustment cap 44 and the underpressure adjustment cap 46 are displaceable along axis A towards and away from the diaphragm 42 to adjust spring tension of the overpressure spring 30 and the underpressure spring 32 on the diaphragm plate 37. The distance between the adjustment caps 44, 46 and the diaphragm plate 37 determines the overpressure and underpressure set points for the slam-shut safety device 10.

Figure 2:
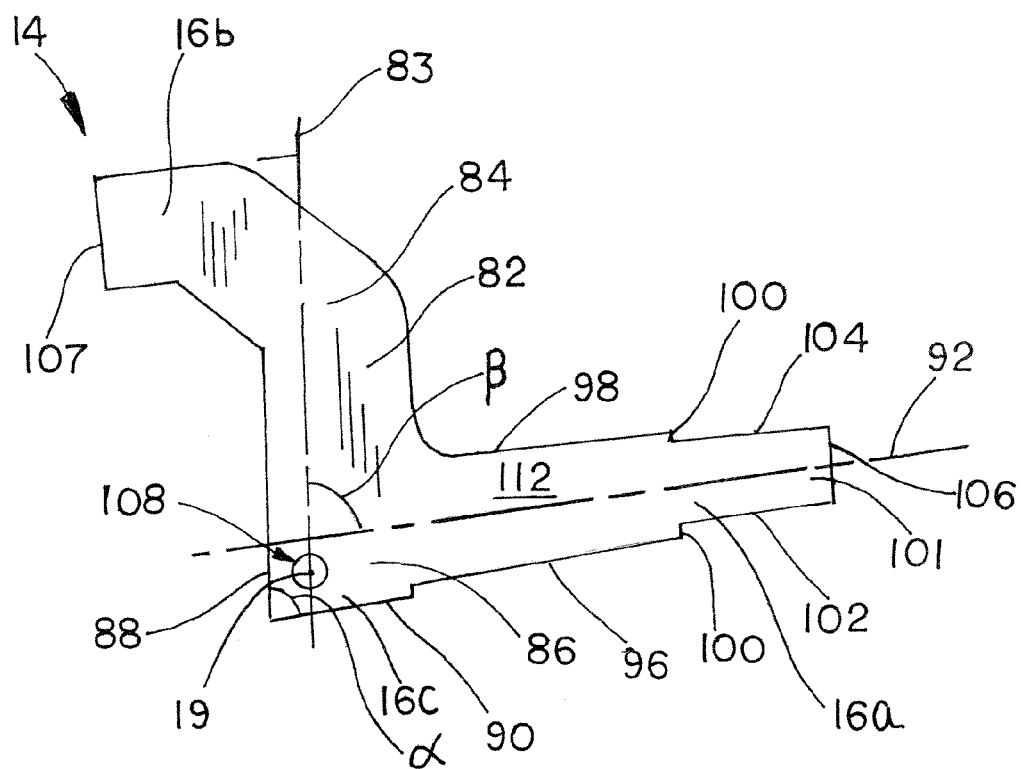
FIG. 2 is a side view of a cam of the slam-shut safety device of FIG. 1.
Figure 3:
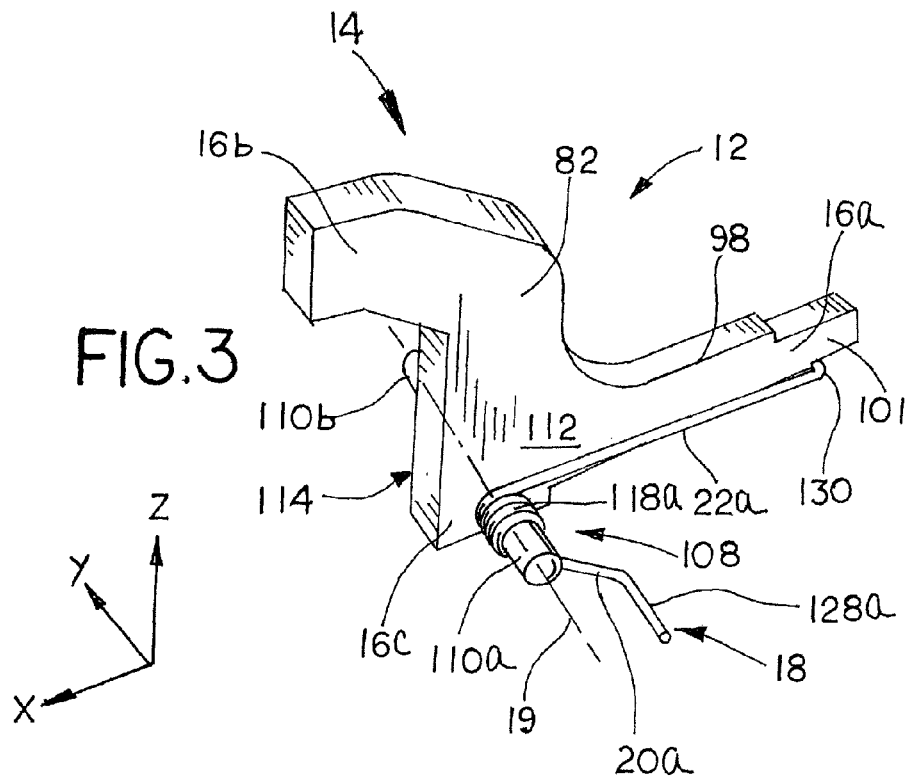
FIG. 3 is a perspective view of a cam assembly of the slam-shut safety device of FIG. 1.

As illustrated in FIGS. 1, 2, and 3, the slam-shut safety device 10 includes the cam assembly 12, and the cam assembly 12 may include the cam 14 that is rotatably disposed within an interior portion of the valve body 13. The cam 14 may be substantially planar, and the cam 14 may rotate about the rotational axis 19 of the cam 14. The rotational axis 19 of the cam 14 may be horizontal and may be normal to a vertical plane that extends through a longitudinal midpoint of the valve body 13 and the upper case 15, and the axis A may extend through and along the vertical plane. Put another way, the vertical plane may be parallel to or coplanar with the X-Z plane of the reference coordinate system provided in FIGS. 1 and 3, and therefore the rotational axis 19 of the cam 14 may be parallel to or co-linear with the Y axis of the reference coordinate system.

As illustrated in FIG. 2, the cam 14 may include a first cam arm 16a, a second cam arm 16b, a third cam arm 16c, and a cam body 82. The cam body 82 may be elongated and may extend in a substantially vertical direction (i.e., a direction that is parallel to the Z axis of the reference coordinate system), and a cam body axis 83 may longitudinally extend through the cam body 82 and may intersect the rotational axis 19. The cam body 82 may have a top portion 84 and a bottom portion 86 that is opposite the top portion 84. The third cam arm 16c may be disposed adjacent to the bottom portion 86 of the cam body 82, and the third cam arm 16c may be at least partially defined by a front cam edge 88 and a first bottom cam edge 90. The front cam edge 88 may be parallel to the cam body axis 83, and the first bottom cam edge 90 may form a first angle α with the front cam edge 88. The first angle α may be an acute angle, and the first angle α may be between about 85 degrees and about 50 degrees. The front cam edge 88 may intersect the first bottom cam edge 90 to form a sharp corner, or a rounded or beveled edge may be formed between the front cam edge 88 and the first bottom cam edge 90 to further define the first cam arm 16a.

Referring again to FIG. 2, the cam 14 also includes the first cam arm 16a that extends from the bottom portion 86 of the cam body. More specifically, the elongated first cam arm 16a extends along a first cam axis 92 that bisects the first cam arm 16a, and the first cam axis 92 may intersect the cam body axis 83 to form a second angle β. The second angle β may be an acute angle, and the second angle β may be between about 85 degrees and about 50 degrees. The first angle α and the second angle β may be equal such that the first bottom cam edge 90 is parallel to the first cam axis 92. A pair of first cam side edges 96, 98 may partially laterally define the first cam arm 16a, and one or both of the first cam side edges 96, 98 may be parallel to the first cam axis 92, with the first bottom cam edge 90 of the third cam arm 16c being parallel to and slightly offset from the first cam side edge 96. An inwardly projecting shoulder 100 may be formed between the cam body 82 and a distal end 101 of the first cam arm 16a, and the shoulder 100 may extend between one or both of the first cam side edges 96, 98 and a pair of second cam side edges 102, 104. A distal edge 106 may extend between the second cam side edges 102, 104 to further define the first cam arm 16a. The pair of second cam side edges 102, 104 may intersect the distal edge 106 to form a sharp corner, or a rounded or beveled edge may be formed between the distal edge 106 and one or both of the second cam side edges 102, 104.

Still referring to FIG. 2, the cam 14 also includes the second cam arm 16b that extends from the top portion 84 of the cam body in a direction that is substantially opposite to that of the first cam arm 16a. The second cam arm 16b may be partially defined by a contact edge 107 that may be parallel to and outwardly offset from the cam body axis 83 (and the front cam edge 88). The contact edge 107 of the second cam arm 16b may be coupled to the limit switch 142 in a manner that will be described in more detail below.

Figure 4:
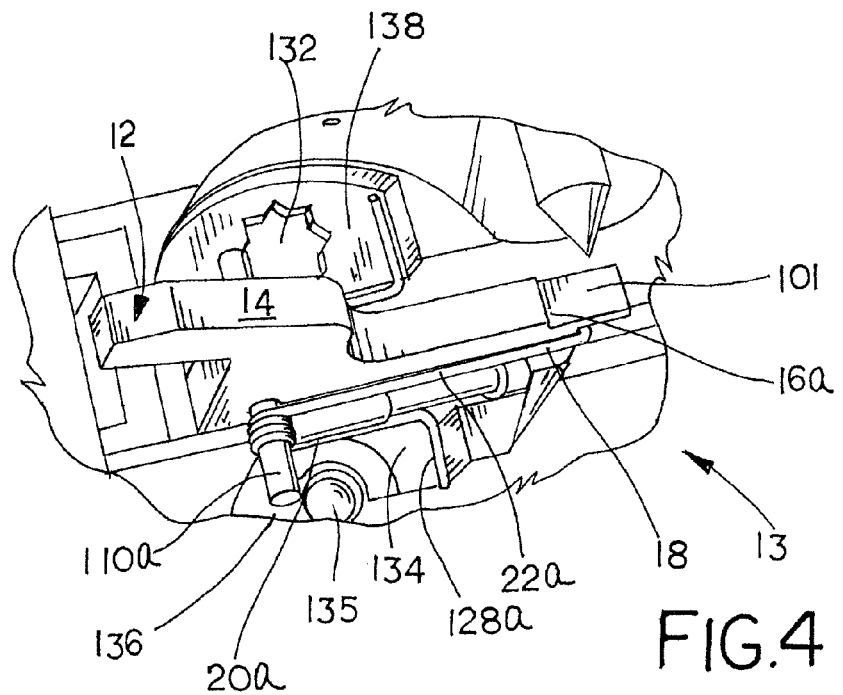
FIG. 4 is a perspective view of the cam assembly of FIG. 4 disposed within the interior of a valve body.

As illustrated in FIGS. 2, 3, and 4, the cam 14 of the cam assembly 12 may also include a hinge pin 108. The hinge pin 108 may be cylindrical, and the longitudinal axis of the cylinder may be coaxial with the rotational axis 19 of the cam 14. Accordingly, the hinge pin 108 may be disposed on or adjacent to the third cam arm 16c. The hinge pin 108 may be inserted in an aperture that extends through the bottom portion 86 of the cam body 82 along the rotational axis 19 such that the hinge pin 108 is symmetrically disposed about a vertical plane that longitudinally bisects the cam 14 (i.e., a plane that is parallel to or coplanar with the X-Z plane of the reference coordinate system). However, the hinge pin 108 may be integrally formed with the cam 14. So configured, a first hinge pin portion 110a may extend from a planar first surface 112 of the cam 14 and a second hinge pin portion 110b may extend from a planar second surface 114 of the cam 14. Each of the first hinge pin portion 110a and the second hinge pin portion 110b may be received into corresponding grooves 134 (as illustrated in FIG. 4), bores, or recesses formed on an interior surface of the valve body 13 such that the cam 14 rotates about its rotational axis 19 when the first and second hinge pin portions 110a, 110b are received into corresponding grooves or bores.

As illustrated in FIGS. 3, 4, 5A and 5B, the cam assembly 12 of the slam-shut safety device 10 also includes a torsional spring 18 that may be coupled to the valve body 13 and may be adapted to engage the first cam arm 16a of the cam 14 to maintain the cam 14 in a desired position to facilitate the rearming of the slam-shut safety valve 10 (in a manner that will be described in more detail below) after the slam-shut safety valve closes. The torsional spring 18 may be formed from a single length of wire, such as spring steel wire having a diameter of 0.4 mm. The torsional spring 18 may have a first coil portion 118a that comprises a helical coil of wound wire that acts as a torsional spring in a known manner. The helical coil of the first coil portion 118a may form a cylindrical shape having an inner diameter that is slightly larger than the diameter of the first hinge pin portion 110a of the cam 14. As such, the first hinge pin portion 110a can be received into the first coil portion 118a such that a longitudinal axis of the first coil portion 118a is coaxial or approximately coaxial with the rotational axis 19 of the cam 14. The first outer arm 20a may extend from an outer end 122a of the first coil portion 118a, and the first outer arm 20a may linearly extend in a direction that is parallel to the planar first surface 112 of the cam 14 (i.e., in a direction that is confined to the X-Z plane in the reference coordinate system). The first inner arm 22a may extend from an inner end 124a of the first coil portion 118a, and the first inner arm 22a may linearly extend in a direction that is parallel to the planar first surface 112 of the cam 14. A distal end 126a of the first inner arm 22a may be disposed adjacent to the distal end 101 of the first cam arm 16a. When viewed along the rotational axis 19 of the cam 14 (i.e., when viewed normal to the X-Z plane of the reference coordinate system), the first inner arm 22a may be disposed at an angle γ relative to the first outer arm 20a, and this angle γ may be about 38 degrees when the torsional spring is not compressed by a load. A first axial arm 128a may extend from a distal end of the first outer arm 20a, and the first axial arm 128a may linearly extend in a direction that is parallel to the rotational axis 19 of the cam (i.e., the Y axis in the reference coordinate system). However, the first axial arm 128a may extend in any direction that allows the first axial arm 128a to engage a surface of the interior of the valve body 13.

Figure 5A:
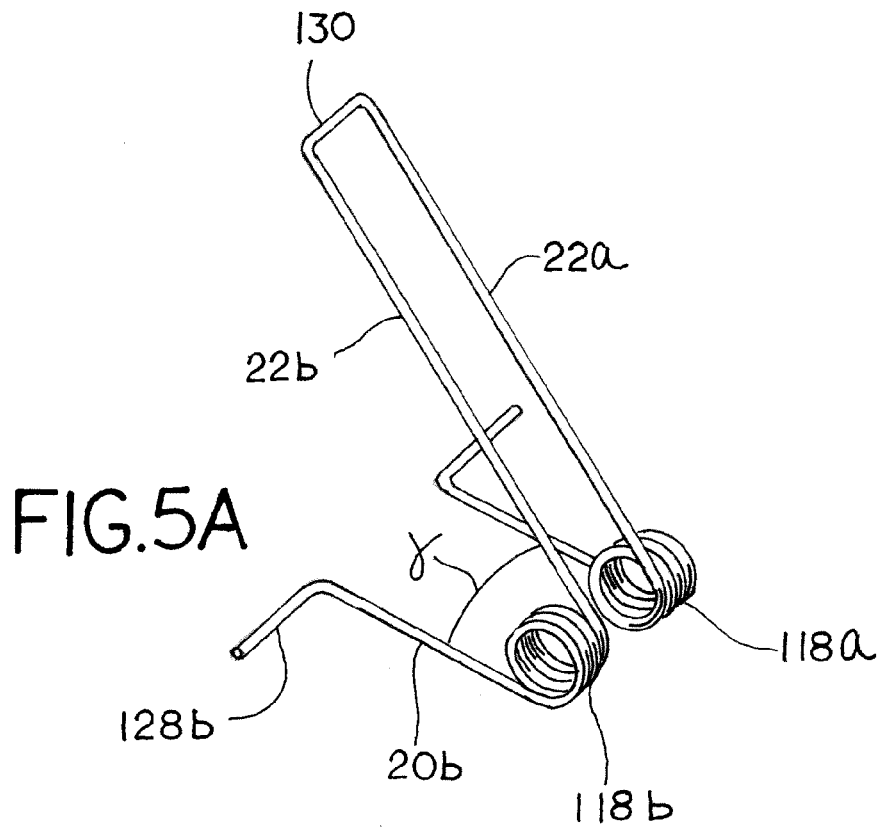
FIG. 5A is a perspective view of a torsional spring of the cam assembly of FIG. 4.
Figure 5B:
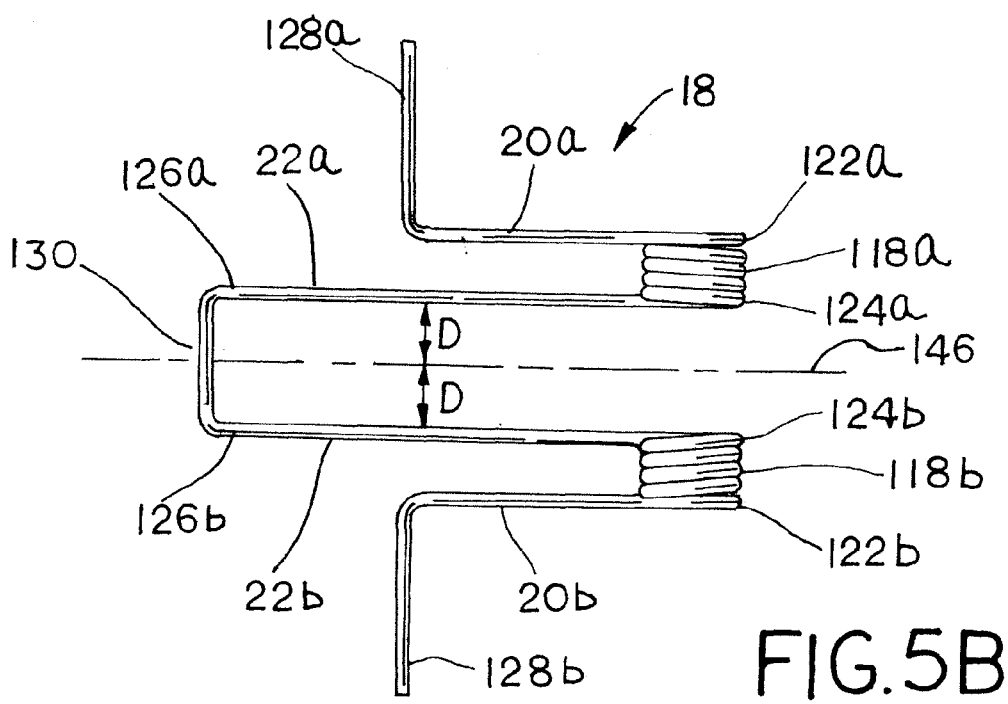
FIG. 5B is a top view of the torsional spring of FIG. 5A.

Referring to FIGS. 3, 5A and 5B, the torsional spring 18 may be symmetrical about a vertical reference plane 146 that is normal to one or both of the rotational axis 19 of the cam 14 and the longitudinal axis of the first coil portion 118a, thereby forming a double torsional spring. Said another way, the vertical reference plane 146 may be parallel to or coplanar with the X-Z plane of the reference coordinate system. As such, the second inner arm 22b may be disposed a distance D from the vertical reference plane 146 and the first inner arm 22a may be disposed by the same distance D from the vertical reference plane 146. A cross arm 130 may extend between the distal end 126a of the first inner arm 22a and the distal end 126b of the second inner arm 22b, and the cross arm 130 may be normal to the vertical reference plane 146 (i.e., parallel to or co-linear with the Y axis of the reference coordinate system). The second inner arm 22b may extend from an inner end 124b of a second coil portion 118b, and the second inner arm 22b may linearly extend in a direction that is parallel to the planar second surface 114 (and the first surface 112) of the cam 14. Because the first inner arm 22a is disposed adjacent to the first surface 112 of the cam 14 and the second inner arm 22b is disposed adjacent to the second surface 114 of the cam 14, the torsional spring 18 prevents the cam 14 from laterally displacing (i.e., displacing relative to the valve body in a direction along the Y axis of the reference coordinate system). The helical coil of the second coil portion 118b forms a cylindrical shape having an inner diameter that is slightly larger than the diameter of the second hinge pin portion 110b of the cam 14. As such, the second hinge pin portion 110b can be received into the second coil portion 118b such that a longitudinal axis of the first coil portion 118a is coaxial or approximately coaxial with one or both of the rotational axis 19 of the cam 14 and the longitudinal axis of the first coil portion 118a. A second outer arm 20b may extend from an outer end 122b of the second coil portion 118b, and the second outer arm 20b may linearly extend in a direction that is parallel to the planar second surface 114 (and the first surface 112) of the cam 14 (i.e., in a direction that is confined to the X-Z plane in the reference coordinate system). The second inner arm 22b may be disposed at an angle γ relative to the second outer arm 20a when viewed along the rotational axis 19 of the cam 14, and this angle γ may be about 38 degrees when the torsional spring is not compressed by a load. A second axial arm 128b may extend from a distal end of the second outer arm 20b, and the second axial arm 128b may linearly extend in a direction that is parallel to the rotational axis 19 of the cam (i.e., the Y axis in the reference coordinate system). However, the second axial arm 128b may extend in any direction that allows the second axial arm 128b to engage a surface of the interior of the valve body 13.

As explained above and as illustrated in FIG. 3, the first hinge pin portion 110a of the cam 14 may be received into the first coil portion 118a of the torsional spring 18 and the second hinge pin portion 110b of the cam 14 may be received into the second coil portion 118b of the torsional spring 18. So configured, the first hinge pin portion 110a and the second hinge pin portion 110b of the cam 14 may each be coupled to an interior portion of the valve body 13 to allow the cam 14 to rotate or pivot relative to the valve body 13, as illustrated in FIG. 4. Moreover, any of the first and second outer arms 20a, 20b and the first and second axial arms 128a, 128b of the torsional spring 18 may engage a portion of the interior of the valve body 13 to provide a stable base to allow the first and second inner arms 12a, 22b to rotatably displace (i.e., pivot) relative to the stationary first and second outer arms 20a, 20b in a manner that will be described in more detail below. For example, an aperture 135 may be formed on an interior surface 134 of the valve body 13, and the interior surface 134 may be substantially horizontal. The groove 136 adapted to receive the first hinge pin portion 110a may also be formed in the interior surface 134. As such, when a bolt 132 is received into the aperture 135, a bottom surface of the head of the bolt 132 may secure the first hinge pin portion 110a within the groove 136 such that the cam 14 can pivot about the first hinge pin portion 110a, but the first hinge pin portion 110a cannot be upwardly displaced to be removed from the groove 136. The first axial arm 128a of the torsional spring 18 may also be disposed on the interior surface 134, and the first outer arm 20a may be disposed adjacent to an edge portion of the interior surface 134. One having ordinary skill in the art would recognize that the second hinge pin portion 110b may be disposed within a groove 136 formed in an interior surface 138 of the valve body 13 in a manner identical to the manner described above. So configured, one having ordinary skill in the art would recognize that the first outer arm 20a being adjacent to (and inwardly disposed relative to) an edge portion of the interior surface 134 and that the second outer arm 20b being disposed adjacent to (and inwardly disposed relative to) an edge portion of the interior surface 138 prevents the torsional spring 18 from laterally displacing.

With the first and second hinge pin portions 110a, 110b of the cam 14 received into the first and second coil portions 118a, 118b of the torsional spring 18, respectively, the cross arm 130 may engage (i.e., maintain operative contact with) a portion of the first cam arm 16a that is adjacent to the distal end 101 of the first cam arm 16a. More specifically, as illustrated in FIG. 3, the cross arm 130 may engage a surface formed normal to or substantially normal to an edge of the first cam arm 16a that extends along the length of the first cam arm 16a, and the surface may be normal to and extend between the first surface 112 and the second surface 114 of the cam 14. For example, with reference to FIG. 2, the cross arm 130 may engage a surface formed normal to or substantially normal to the first cam side edge 96 (if the first cam side edge 96 extends along the entire length of the first cam arm 16a) or the second cam side edge 102 (if a shoulder 100 is formed between the first cam side edge 96 and the second cam side edge 102. The first inner arm 22a and the second inner arm 22b may each be slightly offset from the first surface 112 and the second surface 114 of the cam 14, and the offset distance between the arms 22a, 22b and the surfaces 112, 114 may be equal. So configured, one having ordinary skill in the art would recognize that the torsional spring 18 causes the cam 14 to have a tendency to rotate or pivot about the rotational axis 19 in a counter clockwise direction (as illustrated in FIG. 1) towards the diaphragm 42.

Turning again to FIG. 1, a portion of the second cam arm 16b of the cam 14 may be coupled to a limit switch 142. For example, the contact edge 107 of the second cam arm 16b that is outwardly offset from the cam body axis 83 (illustrated in FIG. 2) may be in contact with a portion of the limit switch 142. The cam 14 may be coupled to the diaphragm 42 via a plunger 64 at the first cam arm 16a. The plunger 64 includes a plunger arm 65 extending downward (i.e., away from the diaphragm 42 and towards the first cam arm 16a). The plunger arm 65 is connected to the cam 14 at a connection point 67 disposed along the length of the first cam arm 16a, and the connection point 67 is disposed between the cam body axis 83 and the distal end 101 of the cam 14. For example, the plunger arm 65 may contact the first cam arm 16a at a contact point 67 located along a first cam side edge 98 that is parallel to and offset from the first cam axis 92. As the plunger arm 65 moves upward in response to an overpressure condition which is strong enough to overcome the force produced by the overpressure spring 30, the cam 14 rotates counterclockwise (in the view illustrated in FIG. 1). As the cam 14 rotates, a latch connected to the first cam arm 16a is released and the slam-shut plug 140 moves to a closed position shutting off the gas supply to the main regulator 11. In alternate embodiments, the rotation of the cam 14 may cause the third cam arm 16c to disengage with a portion of a relatch plug 70 (such as the first shoulder 71a), thereby triggering the slam-shut plug 140 to move to a closed position. In response to an under pressure condition, in which the spring force of the underpressure spring 32 overcomes the system gas pressure, the plunger 64 moves downward causing the cam 14 to rotate in a clockwise direction. After a predetermined amount of rotation of the cam 14, the latch connected to the first cam arm 16a is released and the slam-shut plug 140 moves to the closed position shutting off the gas supply to the main regulator. In alternate embodiments, the rotation of the cam 14 may cause the third cam arm 16c to disengage with a portion of a relatch plug 70 (such as the first shoulder 71 a), thereby triggering the slam-shut plug 140 to move to a closed position. The limit switch 142 detects movement of the diaphragm 42 through rotation of the cam 14 because the limit switch 142 is directly linked to the second cam arm 16b of the cam 14, which is linked to the diaphragm 42 by the first cam arm 16a of the cam 14 and the plunger 64. In this manner, the limit switch 142 moves longitudinally in response to small variations in pressure, thus detecting diaphragm 42 movement, even if a reset pin assembly 66 is damaged.

Figure 6A:
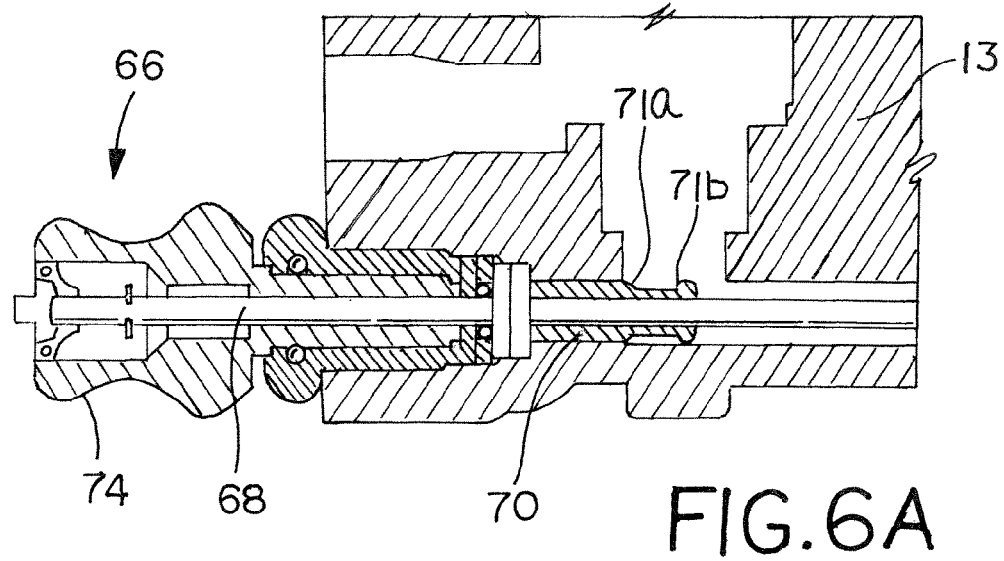
FIG. 6A is a sectional view of a reset pin assembly of the slam-shut safety device shown in FIG. 1 with the cam assembly omitted for clarity.
Figure 6B:
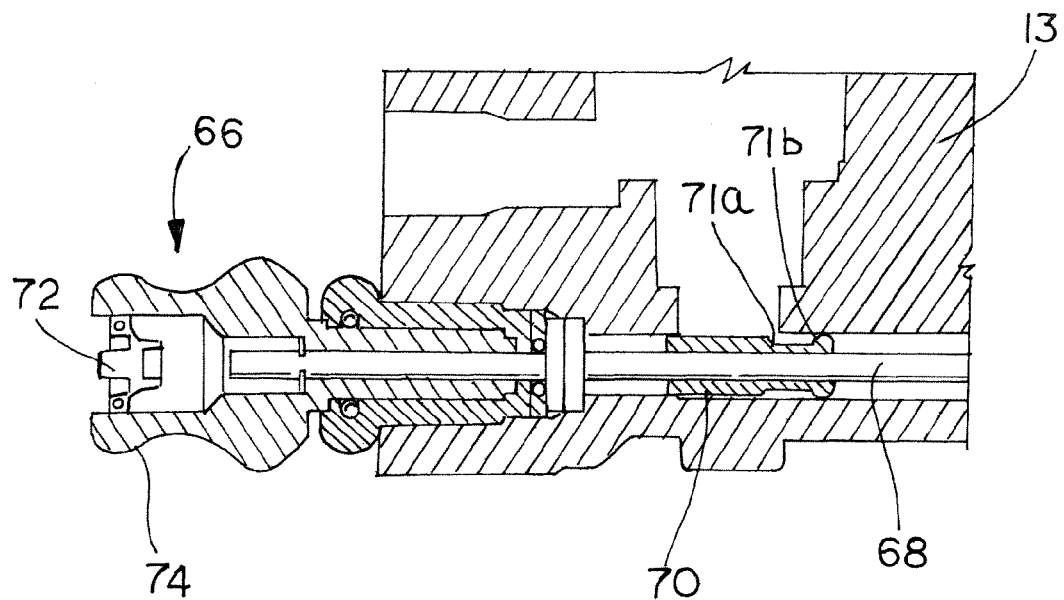
FIG. 6B is a sectional view of the reset pin assembly of FIG. 6A with the cam assembly omitted for clarity.

The slam-shut safety device 10 may also include the reset pin assembly 66 for relatching the cam 14. As illustrated in FIGS. 1, 6A, and 6B, the reset pin assembly 66 may include a reset rod 68, a relatch plug 70, a travel indicator 72, and a reset sleeve 74. The reset rod 68 is slidable in the reset sleeve 74 in response to an interaction between the relatch plug 70 and the cam 14 at the third cam arm 16c. As the cam 14 rotates in response to movement of the diaphragm 42, the third cam arm 16c (not shown in FIGS. 6A and 6B) may contact a first shoulder 71a of the relatch plug 70 and may force the relatch plug 70 outward (to the left in FIGS. 1, 6A, and 6B). This, in turn, may move the reset rod 68 outward, and the reset rod 68 may contact the travel indicator 72. The travel indicator 72 may be formed of a resilient, deformable material. When the reset rod 68 contacts the travel indicator 72, a center portion of the travel indicator 72 may be deformed outward (as shown in FIG. 6A), thereby producing a visual and tactile indication that the cam 14 has rotated in response to an over or under pressure condition. The travel indicator 72 provides protection from water or other environmental factors by forming a seal between within the reset sleeve 74, thereby protecting the reset rod 68.

Figure 7A:
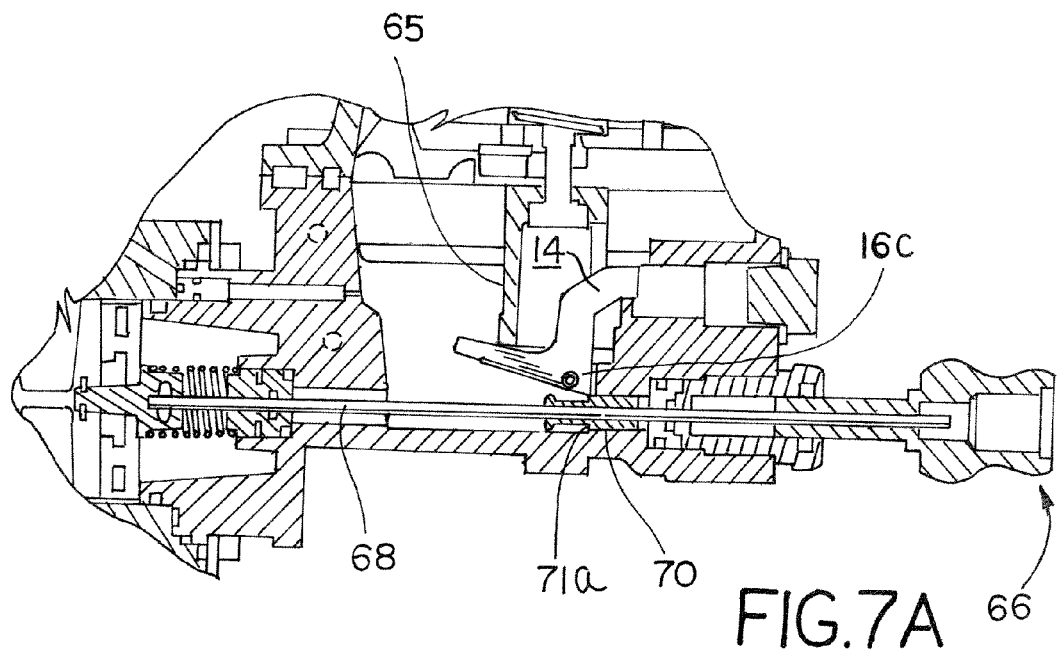
FIG. 7A is a sectional view of a reset pin assembly of the slam-shut safety device shown in FIG. 1 with the reset pin in a relatch position, and with the torsional spring omitted for clarity.
Figure 7B:
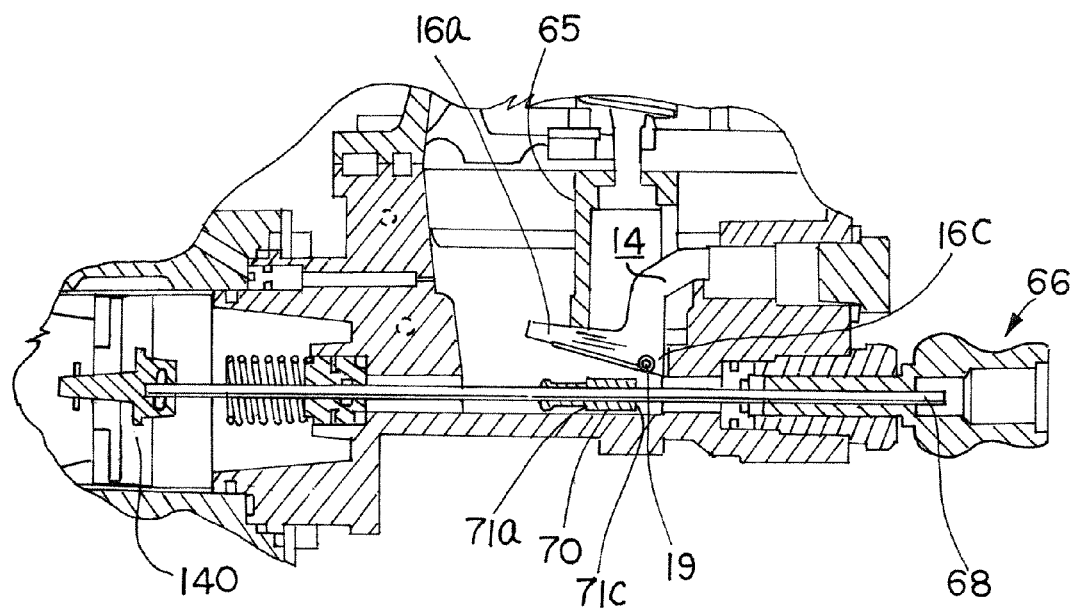
FIG. 7B is a sectional view of a reset pin assembly of FIG. 7B with the reset pin in a reset position, and with the torsional spring omitted for clarity.

Once the over/under pressure condition is corrected, the reset pin assembly 66 may be used to relatch the cam 14 (i.e., rearm the slam-shut safety device 10), and a cam 14 in an unlatched state is illustrated in FIG. 7B. In one such valve rearming process that is shown in FIGS. 7A and 7B, a user may displace one end of the reset rod 68 (the end disposed in the travel indicator 72) away from the cam 14 and the interior of the valve body 13 (i.e., to the left in FIG. 1 and to the right in FIG. 7B). In doing so, the relatch plug 70 may also be displaced and a leading shoulder 71c of the relatch plug 70 may be contact the third cam arm 16c. As the reset rod 68 continues to be displaced away from the cam 14, the third cam arm 16c remains in contact with a portion of the relatch plug 70 between the first shoulder 71a and the leading shoulder 71c until the first shoulder 71a reaches the third cam arm 16c. Further displacement of the reset rod 68 results in the third cam arm 16c (i.e., the front cam edge 88 and/or the first bottom cam edge 90 that at least partially define the third cam arm 16c) engaging the first shoulder 71a of the relatch plug 70, thereby relatching the cam 14, as illustrated in FIG. 7A. One having ordinary skill in the art would recognize that the torsional spring 18 engaging the first cam arm 16a of the cam 14 maintains the cam 14 in a position that allows the third cam arm 16c to remain in contact with a portion of the relatch plug 70 between the first shoulder 71a and the leading shoulder 71c. In this position, the third cam arm 16c may properly engage the first shoulder 71a of the relatch plug 70 when the reset rod 68 is inwardly displaced a sufficient amount. In this manner, the torsional spring 18 engaging a portion of the first cam arm biases the cam 14 into a position that allows the slam-shut safety device 10 to be rearmed in the valve rearming process described above.

In another contemplated valve rearming process, a user may displace one end of the reset rod 68 (the end disposed in the travel indicator 72) towards the interior of the valve body 13, as illustrated in FIGS. 6A and 6B. In doing so, the relatch plug 70 may also be displaced and a second shoulder 71b of the relatch plug 70 may contact the third cam arm 16c, thereby forcing the cam 14 to rotate into the relatched position. One having ordinary skill in the art would recognize that the torsional spring 18 engaging the first cam arm 16a of the cam 14 maintains the cam 14 in a position that allows the cam 14 to rotate into the relatched position by, for example, preventing the first cam arm 16a from rotating away from the plunger 65 beyond a desired point relative to the relatch plug 70. Such a point may be the position of the cross arm 130 when the only load acting on the torsional spring 18 is the weight of the cam 14.

Configured as described, the first inner arm 22a of the torsional spring 18 is disposed adjacent to (or in contact with) the first surface 112 of the cam 14 and the second inner arm 22b of the torsional spring 18 is disposed adjacent to (or in contact with) the second surface 114 of the cam 14. As such, the torsional spring 18 prevents the cam 14 from laterally displacing (i.e., displacing relative to the valve body in a direction along the Y-axis of the reference coordinate system). The torsional spring 18 may prevent any lateral displacement of the cam 14, or the torsional spring 18 may prevent lateral displacement of the cam 14 beyond an acceptable range (i.e., the lateral distance between the inner diameter of the first inner arm 22a and the inner diameter of the second inner arm 22b). Such a prevention of lateral movement maintains the cam 14 in a centered position or a substantially centered position. For example, a centered position may be a position in which the cam 14 is longitudinally aligned with any or all of a center axis of the plunger 65, a longitudinal midpoint of the valve body 13 and the upper case 15, and axis A. One having ordinary skill in the art would recognize that the centered alignment of the cam 14 can be maintained by the torsional spring 18 and no other guiding components. Moreover, the torsional spring 18 is not prone to jamming or failure from overuse, and therefore improves the reliability and repeatability of the slam-shut safety device 10. One having ordinary skill in the art would also that the cam assembly 12 is easy to assemble, and would reduce assembly (or replacement) time.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A cam assembly for use in a slam-shut safety valve, the cam assembly comprising:
    a cam having an elongated first cam arm, the cam being planar and pivotable about a rotational axis disposed adjacent to a first end of the first cam arm, the cam including an elongated cam body having a top portion and a bottom portion opposite the top portion, and wherein a cam body axis longitudinally extends through the cam body, wherein the first cam arm extends from the bottom portion of the cam body and a second cam arm extends from the to portion of the cam body in a direction opposite to the first cam arm; and
    a torsional spring having a pair of stationary outer arms and a pair of pivotable inner arms, wherein the pair of inner arms is coupled to a portion of the first cam arm, wherein a cross arm extends from a distal end of a first inner arm of the pair of inner arms to a distal end of a second inner arm of the pair of inner arms, and the cross arm engages a portion of the first cam arm that is adjacent to a second end of the first cam arm, and wherein the pair of inner arms is adapted to act on the first cam arm to bias the cam into a relatching position.

2. The cam assembly of claim 1, wherein the pair of inner arms is symmetrically disposed about the first cam arm to prevent lateral displacement of the cam.

3. The cam assembly of claim 1, wherein the first cam arm extends along a first cam axis that bisects the first cam arm, and the first cam axis intersects the cam body axis to form an acute angle.

4. The cam assembly of claim 1, wherein a third cam arm is disposed adjacent to the bottom portion of the cam body, and wherein the third cam arm is adapted to contact a portion of a reset pin assembly.

5. The cam assembly of claim 4, wherein the third cam arm is at least partially defined by a front cam edge and a first bottom cam edge, and wherein the front cam edge is parallel to the cam body axis, and the first bottom cam edge forms an acute angle with the front cam edge, and wherein the third cam arm is adapted to engage a shoulder of a relatch plug of the reset pin assembly.

6. The cam assembly of claim 1, wherein the cam includes a hinge pin that is coaxial with the rotational axis of the cam, the hinge pin being symmetrically disposed about a plane that longitudinally bisects the cam such that a first hinge pin portion extends from a first surface of the cam and a second hinge pin portion extends from a second surface of the cam.

7. The cam assembly of claim 6, wherein the first hinge pin portion of the cam is received into a first coil portion of the torsional spring, and the second hinge pin portion of the cam is received into a second coil portion of the torsional spring, and wherein the first inner arm of the pair of inner arms of the torsional spring extends from an inner end of the first coil portion and the second inner arm of the pair of inner arms of the torsional spring extends from an inner end of the second coil portion.

8. The cam assembly of claim 7, wherein a first outer arm of the pair of outer arms of the torsional spring extends from an outer end of the first coil portion and a second outer arm of the pair of outer arms of the torsional spring extends from an outer end of the second coil portion.

9. The cam assembly of claim 8, wherein a first axial arm extends from a distal end of the first outer arm and a second axial arm extends from a distal end of the second outer arm, and each of the first axial arm and the second axial arm engages a surface disposed within an interior of the slam-shut safety valve.

* * * * *